US008290432B2

(12) United States Patent
Blineau et al.

(10) Patent No.: US 8,290,432 B2
(45) Date of Patent: Oct. 16, 2012

(54) METHOD FOR SYNCHRONZING USER SIGNAL TRANSMISSIONS WITHIN A HYBRID COMMUNICATION NETWORK

(75) Inventors: Joseph Blineau, Pechabou (FR); Nicolas Chuberre, Pibrac (FR); Michel Cohen, Paris (FR); Olivier Courseille, Auzeville (FR)

(73) Assignee: Alcatel Lucent, Paris (FR)

( * ) Notice: Subject to any disclaimer, the term of this patent is extended or adjusted under 35 U.S.C. 154(b) by 748 days.

(21) Appl. No.: 12/278,293

(22) PCT Filed: Jan. 23, 2007

(86) PCT No.: PCT/FR2007/050675
§ 371 (c)(1),
(2), (4) Date: Oct. 6, 2008

(87) PCT Pub. No.: WO2007/090968
PCT Pub. Date: Aug. 16, 2007

(65) Prior Publication Data
US 2009/0023385 A1    Jan. 22, 2009

(30) Foreign Application Priority Data
Feb. 8, 2006   (EP) ..................................... 06300119

(51) Int. Cl.
*H04B 7/185* (2006.01)
(52) U.S. Cl. ........................... 455/13.1; 455/7; 455/12.1
(58) Field of Classification Search ............. 455/7, 11.1, 455/13.1, 517; 375/130, 142, 211; 370/208, 370/342
See application file for complete search history.

(56) References Cited

U.S. PATENT DOCUMENTS

| | | | |
|---|---|---|---|
| 5,864,579 A * | 1/1999 | Briskman | 375/130 |
| 6,061,387 A * | 5/2000 | Yi | 375/142 |
| 2006/0121922 A1 * | 6/2006 | Krasner | 455/517 |

FOREIGN PATENT DOCUMENTS
EP   1296467 A1   3/2003

OTHER PUBLICATIONS

Patent Abstracts of Japan, vol. 2000, No. 7, Sep. 29, 2000 corresponding to JP2000101502 A (Toshiba Corp.) dated Apr. 7, 2000.
Chachag Yi: "TDM framing for gap filler operation in satellite digital multimedia, broadcasting system A", Vehicular Technology Conference, 2004, VTC 2004-Spring, 2004 IEEE 59th Milan, Italy, May 17-19, 2004, Piscataway, NJ, IEEE, vol. 5, May 17, 2004, pp. 2782-2786, XP010766756.

* cited by examiner

*Primary Examiner* — Lana N Le
*Assistant Examiner* — Golam Sorowar
(74) *Attorney, Agent, or Firm* — Sughrue Mion, PLLC

(57) ABSTRACT

A method is devoted to synchronizing the transmission of user signals within a single-frequency hybrid network comprising at least one transmission satellite (SAT) and regenerative emitters (E1-E6) tasked with retransmitting received user signals to user terminals (T1, T2), using the same frequency and the same waveform. This method consists of temporally shifting, with respect to a time marker (TM) corresponding to the moment when a chosen element of the user signals arrives at a terrestrial reference arc (RA) from said satellite (SAT), the moment when the user signals received by each emitter (E1-E6) are retransmitted, by a local duration which is a function of the respective positions of the emitter and the satellite (SAT) with respect to a chosen reference position (RP) on said arc (RA), so that the same user signals retransmitted by the satellite (SAT) and the emitter (Ei) reach a user terminal (T1, T2) at roughly the same time.

16 Claims, 1 Drawing Sheet

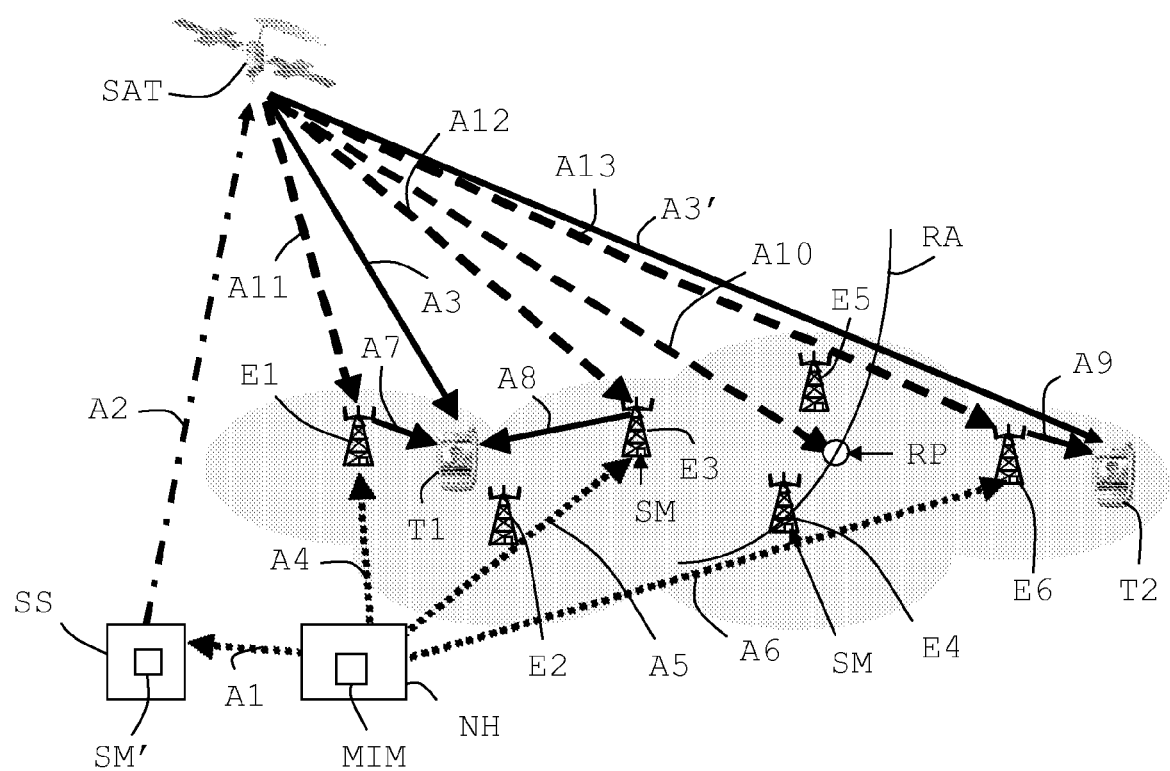

METHOD FOR SYNCHRONZING USER SIGNAL TRANSMISSIONS WITHIN A HYBRID COMMUNICATION NETWORK

The invention pertains to hybrid communication networks, and more precisely to synchronizing downlink transmissions within such networks.

Here, the term "hybrid communication network" refers to a network, or at least part of a network, which is particularly tasked with distributing data to user terminals, by means of at least one transmission satellite, potentially one that is geostationary, and terrestrial emitters, installed in known locations.

Furthermore, here the term "downlink transmissions" refers to the signal transmissions sent from the network to the users' terminals, via the emitters and/or the satellite. Here, it is noted that in a hybrid network the senders and the satellite receive identical data (intended for the users' terminals) from a data distribution network which may be embodied in any form(s) (terrestrial (wired and/or radio) and/or satellite), and that they may retransmit this received data to user terminals as waves.

The invention particularly pertains to mono-frequency hybrid networks, i.e. those in which the signals intended for users' terminals are resent by the emitters and by the satellite using the same frequency and the same waveform, such as OFDM (for "Orthogonal Frequency Division Multiplex") or CDMA (for "Code Division Multiple Access"). More generally, the invention applies to any type of hybrid network in which the data is transmitted (or distributed) as waves in the form of symbols whose length of time (or duration) is small when compared to the dispersion of transmission times between the satellite and the various user terminals which are located within the entire coverage area of said satellite.

As is known to a person skilled in the art, within a single-frequency transmission network, whether it is terrestrial or hybrid, the user terminals that are to receive the radio signals frequently receive the same radio signal from at least two different sources. When identical radio signals reach a terminal with a temporal difference, this may lead to a jamming effect between potentially disruptive symbols.

In a single-frequency terrestrial network, the waveform used tolerates the presence of an echo (or echoes) when the temporal difference is below a threshold, such as when it is equal to the guard time, for an OFDM waveform, or the terminal's Rake window, for a WCDMA waveform. As long as this condition is met, the received signals contribute together positively to the quality of reception. By using distances between emitters which prohibit temporal differences between paths greater than the threshold, and by synchronizing the transmissions of said emitters to an absolute time reference, continuous coverage making it possible to meet the abovementioned condition may be achieved.

In a single-frequency hybrid network, such synchronization of emitters is not possible, because of the length of the temporal differences between the paths taken by a single radio signal retransmitted by the satellite within its coverage area. Typically, the temporal difference between paths taken by a single radio signal between two cities spaced about 1100 km apart (such as Perpignan and Boulogne in France) is about 3 ms, whereas the threshold is limited to about one hundred microseconds ($\mu s$) for a DVB-H OFDM signal.

To remedy this drawback, it has been proposed to use transparent emitters that are equipped with a satellite receiver. The emitters then retransmit the radio signals that they receive from the satellite, and not the signals that they receive from the distribution network. The signals retransmitted by an emitter are therefore synchronized to those transmitted by the satellite, within the local amplification time. This solution makes it necessary, within each emitter, to very heavily insulate the satellite reception part from the resending part, in order to avoid disruptions such as self-oscillation. Furthermore, the signals that are retransmitted by the emitters have been degraded by the satellite path.

As no known solution is fully satisfactory, the object of the invention is therefore to improve the situation, and particularly to enable optimization of the quality of the radio signals received by the user terminals and/or to enable increased flexibility of deployment for the hybrid network.

To that end, it discloses a method devoted to synchronizing the transmission of user signals within a single-frequency hybrid network comprising at least one transmission satellite and emitters tasked with retransmitting received user signals to user terminals, using the same frequency and the same waveform.

This method is characterized by the fact that it consists of temporally shifting, with respect to a time marker corresponding to the moment of arrival of a chosen element of the satellite-originating user signals at a reference terrestrial arc, the moment of retransmission of the user signals received by each emitter by a local duration which depends upon the respective positions of said emitter and satellite relative a chosen reference position on the reference arc, so that the same user signals retransmitted by the satellite and the emitter reach a user terminal at roughly the same time.

The inventive method may include other characteristics, which may be taken separately or in combination, in particular:

the user signals transmitted to each emitter (but also to a satellite station) by a distribution network may be preceded by signaling signals containing the time marker (corresponding to a chosen element of the user signals). The user signals are then also transmitted to a satellite station supplied by the distribution network and preceded by signaling signals containing the time marker. In such a case, the user signals are sent to the satellite by the satellite station with a lead relative to the time marker, which is equal to the sum of the first length of transmission between the satellite station and the satellite and a second length of transmission between the satellite and the reference arc;

each local duration may, for example, be a function of at least the difference between the second length and a third length equal to the length of transmission between the satellite and the emitter in question;

within the satellite station, the transmission lead may be adjusted to take into account the satellite's current drift away from a known position;

each local duration may, for example, be predetermined for each emitter and be constantly applied locally;

information representative of the position of the satellite and the reference position within a chosen terrestrial range of references may be transmitted to each emitter and to the satellite station. In such a case, within each emitter, the second and third lengths are determined, in order to calculate the local length to use;

some of the information may be the ephemeris of the satellite;

in one variant, some of the information may be representative of the satellite's current drift away from a known position;

information representative of the first and second durations may be transmitted to each emitter and to the satellite station. In such a case, within each emitter, the third duration is determined based on at least the change in the second duration, in order to calculate the local duration to use;

the user signals may be transmitted to each emitter by a distribution network, and the user signals, preceded by signaling signals containing the time marker (corresponding to a chosen element of the user signals) may be transmitted to the satellite by means of a satellite station, so that the satellite can retransmit the signaling signals before the user signals. In such a case, the moment when the chosen element of the user signals is received is detected within each emitter, and then the local duration, to be used for retransmitting the user signals that follow, is determined by subtracting the moment when the value of the time marker contained within the received signaling signals was received;

the signaling signals retransmitted by satellite (and by the terrestrial emitters) may contain information representative of the satellite's position (some of the information may be the ephemeris of the satellite, or information representative of the satellite's current drift away from a known position). In such a case, the local duration is adjusted within each emitter as a function of the satellite's position.

The invention is particularly well suited, though not exclusively so, to OFDM or CDMA waveform hybrid networks. However, in a general manner, the invention applies to any type of network in which the data is transmitted as waves in the form of symbols whose length of time (or duration) is small when compared to the dispersion of transmission times between the satellite and the various user terminals which are located within the entire coverage area of said satellite.

Other characteristics and advantages of the invention will become more apparent upon examining the detailed description below, as well as the attached drawing, in which the sole FIGURE schematically depicts a single-frequency hybrid distribution network for implementing the invention. The attached drawing may serve not only to complete the invention, but rather may also contribute to defining it, if need be.

The object of the invention is to enable the optimization of the receipt by user terminals of signals retransmitted by a satellite and by terrestrial emitters of a hybrid distribution network.

In the following description, it will be assumed by way of a non-limiting example that the hybrid distribution network is single-frequency and OFDM. However, the invention applies to any type of network in which the data is transmitted as waves in the form of symbols whose length of time (or duration) is small when compared to the dispersion of transmission times between the satellite and the various user terminals which are located within the entire coverage area of said satellite, and in particular to CDMA networks (such as WCDMA networks).

As the invention pertains to the synchronization of devices of the distribution (or communication) network involved in retransmitting signals to user terminals, the means used to supply these network devices with signals will not be described below in detail.

As is schematically depicted in the sole FIGURE, the distribution (or communication) network comprises at least one network head-end NH, at least one satellite station SS (potentially co-located with the network head-end NH), at least one satellite SAT, potentially one which is geostationary, and terrestrial emitters Ei (here i=1 to 6, but it may assume any value greater than or equal to two (2)).

The network head-end NH is the network device that receives, from the contribution network, the user data which must be retransmitted to the user terminals Tj (here j=1 and 2, but it may assume any value greater than or equal to one (1)) which are located within the coverage area of the distribution network.

Here, the term "coverage area of the distribution network" refers to the space within which user terminals Tj may receive radio signals, known as user signals because they contain user data.

Furthermore, here the term "user terminal" refers to any communication device capable at least of receiving radio signals from the satellite SAT and from the emitters Ei and exhibiting the same waveform and the same frequency. It may, therefore, be a mobile telephone, a personal digital assistant (or PDA), a desktop or portable computer, a television set, a box for receiving (and potentially recording) programs (which may potentially be encrypted), such as a digital music player or game console, a radio receiver, which may be portable or embedded within an individual or mass transport vehicle, or a server with appropriate radio reception means.

The satellite station SS is supplied with user data and signaling data by the network head-end NH via the distribution network (arrow A1). It is tasked with transmitting the user data (in the form of user signals) and, in certain embodiments, certain signaling or control data (in the form of signaling signals), as waves to the satellite SAT (arrow A2). It is important to note that the satellite station SS may be supplied with user data and signaling data by one or more terrestrial (radio and/or wired) and/or satellite distribution networks.

The satellite SAT is tasked with retransmitting (or distributing) the user data and certain control or signaling data that it receives from the satellite station SS to the user terminals Tj located within its coverage area, in the form of user signals and signaling signals, respectively (arrows A3 and A3'). In the following description, by way of an illustrative and non-limiting example, it will be assumed that the satellite SAT is geostationary. However, this is not mandatory.

It is important to note that the signaling signals may or may not be dissociated from the user signals. More precisely, the signaling data that pertains to user data may be integrated into the user signal that includes the previous user data.

The terrestrial emitters Ei are regenerative. They are also supplied with user data and signaling data by the network head-end NH via a distribution network (arrows A4 to A6). They are tasked with retransmitting the user data and, in certain embodiments, certain control or signaling data that they receive from the satellite station SS to the user terminals Tj (arrows F7 to F9) located within their respective coverage areas, in the form of user signals and signaling signals, respectively. It is important to note that the emitters Ei may be supplied with user data and signaling data by one or more terrestrial (radio and/or wired) and/or satellite distribution networks.

Furthermore, each terrestrial emitter Ei includes a synchronization module SM which may, for example, be embodied in the form known to a person skilled in the art as an advanced SYNC System ("Synchronization System"), controlled by a clock, such as a GPS clock. Likewise, the satellite station SS includes a synchronization module SM which may, for example, be embodied in the form of an advanced SYNC System ("Synchronization System"), controlled by a clock, such as a GPS clock.

Here, the satellite SAT and the emitters Ei retransmit the user signals and, if applicable, the signaling signals using the same frequency and the same chosen waveform, such as OFDM or CDMA, because the distribution network is single-frequency.

The invention proposes to temporally shift the moment of retransmission of said user signals which are received by each emitter Ei by a chosen local duration LDi with respect to a time marker TM (corresponding to a chosen element of the user signals).

Here, the term "time marker" TM refers to information representative of a time when a chosen (and precise) element of the user signals is distributed. This time marker TM defines the moment when a chosen element of the user signals retransmitted by the satellite SAT arrived at the reference terrestrial arc. It is determined by the network as a function of a reference position of the satellite SAT and the position of the reference arc RA within the network's coverage area. These positions are defined with respect to a fixed reference point, preferable one connected to the Earth. The time markers TM are transmitted in a recurring manner, preferably always matching a single chosen element of the user signals, such as the beginning of a first packet or the first symbol of a set of symbols.

A local duration LDi corresponds to each emitter Ei, and is representative of the temporal shift that said emitter Ei must apply when retransmitting (or resending) a user signal. This local duration LDi may be positive (a lead) or negative (a delay).

Each local duration LDi (which sets each moment of retransmission) is a function of the respective positions of the emitter in question Ei and the chosen reference position RP on the reference arc RA. Furthermore, each local duration LDi is determined in such a way so that the same user signals retransmitted (or resent) by the satellite SAT and by the emitter in question (Ei) reach the user terminal Tj at roughly the same time. Here, the term "at roughly the same time" refers to near-simultaneity on the order of a few tens of microseconds (typically 10 to 50 μs), and in the majority of situations, less than the guard interval (or window) of the waveform of the retransmitted signal.

The invention may be implemented in different manners, depending on the method used to determine the local duration LDi.

A first manner consists of transmitting to each emitter Ei (as well as to the satellite station SS) a signaling signal containing the time marker TM (corresponding to a chosen element of the user signals), before transmitting to it (as well as to the satellite station SS) said user signals to be retransmitted, which correspond to said time marker TM. This transmission is performed by the network head-end NH via the distribution network(s). More precisely, the network head-end NH may, for example, comprise a control module MIM tasked with determining each time marker TM associated with the chosen element of the user signals to be retransmitted. Said control module MIM may, for example, be embodied in the form of an advanced frame information packet insertion module (or MIP inserter for "Megaframe Information Packet inserter"), of the same sort as those used in single-frequency terrestrial networks.

Every time that the synchronization module SM of an emitter Ei receives a time marker TM (corresponding to a chosen element of the user signals), it shifts the retransmission of the corresponding user signals with respect to said time marker TM, taking into account the local duration LDi which corresponds to its emitter Ei.

On its own end, the synchronization module SM' of the satellite station SS shifts the transmission of the user signals to the satellite SAT in such a way that said user signals can reach the reference arc RA at the moment defined by the corresponding time marker TM. In other words, the satellite station SS transmits the user signals to the satellite SAT with a lead with respect to the time marker TM, with this lead being equal to the sum of a first transmission duration TD between the satellite station SS and the satellite SAT, and a second transmission duration RD between the satellite SAT and the reference arc RA. The first duration TD corresponds to the path indicated by the arrow A2, while the second duration RD corresponds to the path indicated by the arrow A10.

For example, each local duration LDi is a function of at least the difference between the second duration RD and a third duration ESDi, which is equal to the transmission time between the satellite SAT and the emitter in question Ei. In other words, LDi=RD-ESDi. For example, the third duration ESD1 corresponds to the path between the satellite SAT and the first emitter E1, indicated by the arrow A11, the third duration ESD3 corresponds to the path between the satellite SAT and the third emitter E3, indicated by the arrow A12, and the third duration ESD6 corresponds to the path between the satellite SAT and the sixth emitter E6, indicated by the arrow A13. Thus, for these three examples: LD1=RD-ESD1, LD3=RD-ESD3, and LD6=RD-ESD6.

The lead used when transmitting the user signals from the satellite station SS is determined based on the knowledge of the respective positions of the satellite SAT and the reference arc RA with respect to the chosen reference point.

This lead may be considered fixed, and therefore constant, when it is assumed as an initial approximation that the satellite SAT is perfectly immobile with respect to a known reference position.

In such a case, all of the first TD, second RD, and third ESDi durations are considered constant. Consequently, each local duration LDi is also constant, and may be predetermined for each emitter Ei and be constantly applied locally. As soon as an emitter Ei receives a signaling signal including a time marker TM (correspond to a chosen element of the user signals), its synchronization module SM shifts its retransmission with respect to said time marker TM by subtracting the predetermined local duration LDi (positive or negative) from said time marker TM. The moment of retransmission ti of a user signal is thus defined as follows: ti=TM-LDi.

In the example depicted in the sole FIGURE, as the path between the satellite SAT and the first emitter E1 is shorter than the path between the satellite SAT and the reference position RP on the reference arc, consequently ESD1<RD and therefore LDi>0. The moment t1 when the emitter E1 retransmits the chosen element of the user signals is then prior to the time marker TM (t1<TM). On the other hand, in this example, the path between the satellite SAT and the sixth emitter E6 is longer than the path between the satellite SAT and the reference position RP on the reference arc, consequently ESD1>RD and therefore LDi<0. The moment t6 when the emitter E6 retransmits the chosen element of the user signals is then later than the time marker TM (t6>TM).

However, in one variant, the lead used when transmitting the user signals from the satellite station SS may be considered variable when it is assumed that the satellite SAT has slowly drifted away from a reference position, which is generally the case. This drift leads not only to a change in the first duration TD, but also the second RD and third ESDi durations, and potentially the arc which forms the intersection of the signal with the surface of the Earth. As a reminder, a geostationary satellite is normally considered to move within a cube about 10 km on each side, which may cause a maximum change in the sum of the first TD and second RD durations (the uplink-downlink path via the satellite SAT) of about 20 μs.

In such a case, the synchronization module SM' of the satellite station may adjust the transmission lead, taking into account the current drift of the satellite SAT away from its known reference position. The definition of the drift may, for example, be communicated to the satellite station SS by the control module MIM of the network head-end NH. In one variant, the control module MIM of the network head-end NH may, for example, transmit the ephemeris of the satellite SAT to the satellite station SS via the distribution network(s), so that its synchronization module SM' can determine the lead to apply.

It is important to note that in order to take the drift of the satellite SAT into account, the local duration LDi of the retransmission shift may be adjusted within each emitter Ei instead of changing the lead used for transmitting the user signals from the satellite station SS.

In such a case, information representative of the position of the satellite SAT and the reference position RP within the chosen terrestrial reference point may be transmitted to each emitter Ei and to the satellite station SS. This transmission may, for example, be performed by the control module MIM of the network head-end NH via the distribution network(s), by means of a signaling signal. Some of the information may, for example, represent the ephemeris of the satellite SAT or the current drift of the satellite SAT away from a reference position.

Upon receiving this information, the synchronization module SM of each emitter Ei first determines the values of the second RD and third ESDi durations, taking into account the current position of the satellite SAT (or whatever amounts to its current drift). Next, it calculates the local duration LDi (LDi=RD−ESDi) to use in order to shift the moment ti of retransmission from its emitter Ei (ti=TM−LDi).

In one variant, instead of transmitting the ephemeris or the drift of the satellite SAT, information representative of the current first TD and second RD durations (a function of the actual current position of the satellite SAT) may be transmitted to each emitter Ei and to the satellite station SS. This transmission may, for example, be performed by the control module MIM of the network head-end NH via the distribution network(s), by means of a signaling signal. In such a case, the synchronization module SM of each emitter Ei first determines the value of the third duration ESDi as a function of at least the variation in the second duration RD received. Next, it calculates the local duration LDi (LDi=RD−ESDi) to use in order to shift the moment ti of retransmission from its emitter Ei (ti=TM−LDi).

A second manner consists of transmitting a signaling signal containing the time marker TM (corresponding to a chosen element of the user signals) to the satellite SAT (as well as to the emitters Ei), by means of the satellite station SS, before transmitting to it the corresponding user signals to be retransmitted. This time marker TM may, for example, have been previously transmitted by the control module MIM of the network head-end NH to the satellite station SS via the distribution network(s). The satellite SAT is then tasked with sending the signaling signal so that it can reach the emitters Ei over the satellite path. As previously indicated, the satellite SAT may transmit the signaling data related to user data either in the form of a signaling signal dissociated from, and preceding, the user signal which comprises said user data, or integrated into the user signal which comprises the previous user data.

For this to occur, each emitter Ei must have a receiver capable of receiving the signaling signals and user signals transmitted by the satellite SAT (preferably well-insulated from its signal retransmission device).

In this manner, whenever an emitter Ei, using its satellite receiver, receives a signaling signal containing a time marker TM (from the satellite SAT and corresponding to a chosen element of the user signals), its synchronization module SM dates (or detects) the moment of reception tri of said chosen element of the user signals. This dating is done with respect to the clock of the emitter Ei. Next, the synchronization module SM determines the local duration LDi to be used locally, by subtracting the moment of reception tri designated by the time marker TM (LDi=TM−tri). At this point, all that is left to do is to shift the moment ti of retransmission from its emitter Ei with respect to the time marker TM received, taking into account the determined local duration LDi (ti=TM−LDi). This requires that the condition LDi>ti−tri be met, or in other words, that the time separating the moment of retransmission ti of a user signal from the moment of reception tri of a signaling signal be large enough, and in particular, strictly greater than the local duration LDi.

The foregoing corresponds to a situation in which it is assumed in an initial approximation that the satellite SAT is perfectly immobile with respect to its reference position. However, it may alternatively be assumed that the satellite SAT is not immobile with respect to its reference position. In such case, the time marker TM no longer corresponds to the moment when a chosen element of the satellite user signals arrived at the reference position RP on the reference arc RA. In other words, this occurs in the presence of a mobile reference point MRP, and the measured value LDi varies accordingly (in such a case, it is not necessary to know the position of the mobile reference point (MRP), as the implemented method relies upon the difference between the paths). Each time that an emitter Ei receives a signaling signal containing a time marker TM with its satellite receiver and the corresponding chosen element of user signals (received from the satellite SAT), its synchronization module SM determines the adjustment that must be made to the local duration LDi, taking into account the difference received. At this point, all that is left to do is to shift the moment ti of retransmission from its emitter Ei with respect to the time marker TM received, taking into account the adjusted local duration LDi (ti=TM−LDi).

The synchronization modules MS and MS', respectively being those of the emitters Ei and the satellite station SS, may be embodied in the form of electronic circuits, software (or computing) modules, or a combination of circuits and software.

In the foregoing, an implementation of the invention for a single-frequency hybrid network was described. However, the invention also applies to two-frequency hybrid networks, i.e. those in which the (or each) satellite SAT retransmits the user signals (and, if any, the signaling signals) using a first frequency and a selected waveform, such as OFDM or CDMA, while the emitters Ei retransmit the user signals and any signaling signals using a second frequency and either the same chosen waveform or a different waveform.

In such a case, the inventive method consists of temporally shifting, with respect to a time marker TM corresponding to the moment of the arrival of a chosen element of the user signals from the satellite SAT at a terrestrial reference arc RA, the moment when the user signals received by each emitter Ei are retransmitted by a local duration which depends upon the respective positions of said emitter Ei and said satellite SAT with respect to a chosen reference position RP on the reference arc RA, so that the same user signals retransmitted by the satellite SAT and the emitter Ei (over first and second frequencies, respectively) reach the user terminal Tj at roughly the same time.

It should be noted that in this application, the user terminals Tj must include two reception channels capable of receiving user signals over the first and second retransmission frequencies of the satellite SAT and the emitters Ei, and whose outputs preferably both feed the same signal decoder.

Furthermore, the various manners of implementing the invention, described above for a single-frequency hybrid network, may also be implemented for a dual-frequency hybrid network.

The invention is not limited to the embodiments of the synchronization and transmission method, the regenerative emitter, the satellite station, and the network head-end described above, which are given as an example; rather, it encompasses all variants that a person skilled in the art may envision within the framework of the claims below.

The invention claimed is:

1. A method for synchronizing the transmission of user signals for a single-frequency hybrid network comprising at least one transmission satellite and emitters designed to retransmit received user signals, using the same frequency and the same waveform, to user terminals, said method comprising the step of temporally shifting the moment when the user signals received by each emitter are retransmitted, said shifting comprising shifting said moment by a local duration with respect to a time marker that corresponds to the moment when a chosen element of the user signals arrived at a terrestrial reference arc from said satellite, wherein:
said local duration is a function of the respective positions of said emitter and said satellite with respect to a chosen reference position on said arc, so that the same user signals retransmitted by said satellite and said emitter reach a user terminal at roughly the same time,
said user signals transmitted to each emitter by a distribution network are preceded by signaling signals containing said time marker,
said user signals are transmitted to a satellite station supplied by said distribution network, preceded by signaling signals containing said time marker, and
said user signals are transmitted to said satellite by said satellite station with a lead with respect to said time marker, said lead being equal to the sum of a first transmission duration between said satellite station and said satellite and a second transmission duration between said satellite and said arc.

2. A method according to claim 1, wherein each local duration is a function of at least one difference between said second duration and a third duration equal to the transmission time between said satellite and the emitter in question.

3. A method according to claim 2, wherein said lead is adjusted within said satellite station, taking into account a current drift of said satellite away from a known position.

4. A method according to claim 2, wherein each local duration is predetermined for each emitter and is constantly applied locally.

5. A method according to claim 2, wherein information representative of said satellite's position and said reference position within a chosen terrestrial reference point is transmitted to each emitter and to the satellite station, and wherein within each emitter, said second and third durations are determined in order to calculate said local duration to use.

6. A method according to claim 5, wherein some of said information is the ephemeris of said satellite.

7. A method according to claim 5, wherein some of said information is representative of a current drift of said satellite away from a known position.

8. A method according to claim 2, wherein
information representative of said first and second durations is transmitted to each emitter and to the satellite station, and
within each emitter, said third duration is determined as a function of at least one variation in said second duration in order to calculate said local duration to use.

9. A single-frequency hybrid network comprising a transmission satellite and regenerative emitters designed to retransmit received user signals to user terminals over the same frequency and the same waveform, and a satellite station designed to transmit to said satellite said user signals to be transmitted, wherein said emitters and said satellite station are capable of implementing a method according to claim 1.

10. A method for synchronizing the transmission of user signals for a single-frequency hybrid network comprising at least one transmission satellite and emitters designed to retransmit received user signals, using the same frequency and the same waveform, to user terminals, said method comprising the step of temporally shifting the moment when the user signals received by each emitter are retransmitted, said shifting comprising shifting said moment by a local duration with respect to a time marker that corresponds to a moment when a chosen element of the user signals arrived at a terrestrial reference arc from said satellite, wherein said local duration is a function of respective positions of said emitter and said satellite with respect to a chosen reference position on said arc, so that the same user signals retransmitted by said satellite and said emitter reach a user terminal at roughly the same time, wherein:
said user signals are transmitted by a distribution network to each emitter preceded by signaling signals containing said time marker,
said user signals preceded by signaling signals containing said time marker are transmitted to said satellite by means of a satellite station of said distribution network, in such a way that said satellite retransmits said signaling signals prior to said user signals, and
the moment when the chosen element of the user signals was received is detected within each emitter, and then said local duration to use for retransmitting the following user signals is determined by subtracting said moment when said time marker was received.

11. A method according to claim 10, wherein
said signaling signals retransmitted by said satellite contain information representative of said satellite's position, and
said local duration is adjusted within each emitter as a function of said satellite's position.

12. A method for synchronizing the transmission of user signals for a single-frequency hybrid network comprising at least one transmission satellite and emitters designed to retransmit received user signals to user terminals over two different frequencies, wherein said method comprises the step of temporally shifting the moment when the user signals received by each emitter are retransmitted, said shifting comprising shifting said moment by a local duration with respect to a time marker that corresponds to the moment when a chosen element of the user signals arrives at a terrestrial reference arc from said satellite, wherein said local duration is a function of the respective positions of said emitter and said satellite with respect to a chosen reference position on said arc, so that the same user signals retransmitted by said satellite and said emitter reach a user terminal at roughly the same time, wherein:
- said user signals transmitted to each emitter by a distribution network are preceded by signaling signals containing said time marker,
- said user signals are transmitted to a satellite station supplied by said distribution network, preceded by signaling signals containing said time marker, and
- said user signals are transmitted to said satellite by said satellite station with a lead with respect to said time marker, said lead being equal to the sum of a first transmission duration between said satellite station and said satellite and a second transmission duration between said satellite and said arc.

13. A dual-frequency hybrid network comprising a transmission satellite and regenerative emitters designed to retransmit received user signals over two different frequencies and a single waveform or a different waveform, and a satellite station designed to transmit to said satellite said user signals to be retransmitted, characterized in that said emitters and said satellite station are capable of implementing a method according to claim 12.

14. A method for synchronizing the transmission of user signals for a single-frequency hybrid network comprising at least one transmission satellite and emitters designed to retransmit received user signals to user terminals, said method comprising the step of temporally shifting the moment when the user signals received by each emitter are retransmitted, said shifting comprising shifting said moment by a local duration with respect to a time marker that corresponds to the moment when a chosen element of the user signals arrived at a terrestrial reference arc from said satellite, wherein
- said local duration is a function of the respective positions of said emitter and said satellite with respect to a chosen reference position on said arc, so that the same user signals retransmitted by said satellite and said emitter reach a user terminal at roughly the same time
- said user signals transmitted to each emitter by a distribution network are preceded by signaling signals containing said time marker,
- said user signals are transmitted to a satellite station supplied by said distribution network, preceded by signaling signals containing said time marker, and
- said user signals are transmitted to said satellite by said satellite station with a lead with respect to said time marker, said lead being equal to the sum of a first transmission duration between said satellite station and said satellite and a second transmission duration between said satellite and said arc.

15. A method according to claim 14, wherein said received user signals are retransmitted using the same frequency and the same waveform.

16. A method according to claim 14, wherein said received user signals are retransmitted using different frequencies.

* * * * *